(12) United States Patent
Sun et al.

(10) Patent No.: US 9,415,681 B2
(45) Date of Patent: Aug. 16, 2016

(54) AUTOMOBILE UREA TANK FORMING METHOD

(71) Applicant: Yapp Automotive Parts Co., Ltd., Yangzhou (CN)

(72) Inventors: Yan Sun, Yangzhou (CN); Lin Jiang, Yangzhou (CN); Liang Liu, Yangzhou (CN); Haiyang Zhu, Yangzhou (CN); Xinhua Chen, Yangzhou (CN); Qing Xue, Yangzhou (CN); Guangsong Zheng, Yangzhou (CN)

(73) Assignee: Yapp Automotive Parts Co., Ltd., Yangzhou (CN)

( * ) Notice: Subject to any disclaimer, the term of this patent is extended or adjusted under 35 U.S.C. 154(b) by 316 days.

(21) Appl. No.: 14/232,085

(22) PCT Filed: Sep. 28, 2012

(86) PCT No.: PCT/CN2012/082253
§ 371 (c)(1),
(2) Date: Jan. 10, 2014

(87) PCT Pub. No.: WO2014/032356
PCT Pub. Date: Mar. 6, 2014

(65) Prior Publication Data
US 2015/0258887 A1      Sep. 17, 2015

(30) Foreign Application Priority Data

Aug. 28, 2012 (CN) .......................... 2012 1 0308845
Aug. 28, 2012 (CN) ...................... 2012 2 0429303 U

(51) Int. Cl.
*B60K 15/073* (2006.01)
*B21D 53/88* (2006.01)
(Continued)

(52) U.S. Cl.
CPC ............... *B60K 15/04* (2013.01); *B21D 53/88* (2013.01); *B29C 45/006* (2013.01);
(Continued)

(58) Field of Classification Search
CPC ..................... Y10T 29/49893; Y10T 29/4998; Y10T 29/49968; B21D 53/88; B60K 2015/03032; B60K 15/073; B60K 15/07; B60K 2015/0346; B60K 2015/0344; B60K 2015/03493; B60K 2015/03542; B60K 2015/03528; B60K 2015/03164; B62D 21/16; B29C 45/0062; B29C 45/00; B29C 45/14467; F01N 13/1888
See application file for complete search history.

(56) References Cited

U.S. PATENT DOCUMENTS 2,316,116 A * 4/1943 Thompson ............. B60K 15/06
220/554
4,453,564 A * 6/1984 Bergesio ................. B29C 65/02
137/574

(Continued)

FOREIGN PATENT DOCUMENTS

CN       201045310 Y      4/2008
CN       201902253 U      7/2011
(Continued)

*Primary Examiner* — Jermie Cozart
(74) *Attorney, Agent, or Firm* — The Webb Law Firm

(57) ABSTRACT

The present invention relates to an automobile urea tank and a forming method thereof. The method includes the following steps: 1) producing an upper half casing and a lower half casing through an injection molding method; 2) after the upper half casing and the lower half casing are formed, assembling built-in parts of the upper half casing and the lower half casing; 3) welding the assembled upper half casing and the assembled lower half casing to form a whole; and 4) assembling components on surfaces of the upper half casing and the lower half casing. This method can improve design freedom of built-in elements of the tank body, and can save a lot of raw materials; the structure is simple and firm; moreover, the production efficiency is improved, and the production cycle is shortened.

7 Claims, 8 Drawing Sheets

(51) Int. Cl.

| | | |
|---|---|---|
| *B60K 15/04* | (2006.01) | |
| *B29C 45/00* | (2006.01) | |
| *B29C 45/14* | (2006.01) | |
| *B29D 22/00* | (2006.01) | |
| *F01N 13/18* | (2010.01) | |
| B60K 15/035 | (2006.01) | |
| B60K 15/03 | (2006.01) | |
| B62D 21/16 | (2006.01) | |
| B29L 31/00 | (2006.01) | |
| B29C 65/02 | (2006.01) | |
| F01N 3/20 | (2006.01) | |
| B29C 65/08 | (2006.01) | |
| B29C 65/14 | (2006.01) | |
| B29C 65/16 | (2006.01) | |
| B29C 65/20 | (2006.01) | |
| B29C 65/00 | (2006.01) | |
| B29C 65/06 | (2006.01) | |

(52) U.S. Cl.
CPC ...... *B29C 45/0062* (2013.01); *B29C 45/14467* (2013.01); *B29D 22/003* (2013.01); *B60K 15/073* (2013.01); *F01N 13/1888* (2013.01); *B29C 65/02* (2013.01); *B29C 65/06* (2013.01); *B29C 65/08* (2013.01); *B29C 65/1412* (2013.01); *B29C 65/16* (2013.01); *B29C 65/20* (2013.01); *B29C 66/1312* (2013.01); *B29C 66/54* (2013.01); *B29L 2031/7172* (2013.01); *B60K 2015/0321* (2013.01); *B60K 2015/03032* (2013.01); *B60K 2015/0344* (2013.01); *B60K 2015/0346* (2013.01); *B60K 2015/03164* (2013.01); *B60K 2015/03243* (2013.01); *B60K 2015/03256* (2013.01); *B60K 2015/03309* (2013.01); *B60K 2015/03528* (2013.01); *B60K 2015/03542* (2013.01); *B62D 21/16* (2013.01); *F01N 3/2066* (2013.01); *F01N 2450/22* (2013.01); *F01N 2610/1406* (2013.01); *F01N 2610/148* (2013.01); *F01N 2610/1466* (2013.01); *Y10T 29/49893* (2015.01); *Y10T 29/49963* (2015.01); *Y10T 29/49968* (2015.01)

(56) References Cited

U.S. PATENT DOCUMENTS

| | | | | |
|---|---|---|---|---|
| 6,123,216 | A * | 9/2000 | Yokocho | F02B 63/00 220/4.14 |
| 6,138,859 | A * | 10/2000 | Aulph | B60K 15/03 137/574 |
| 2004/0076776 | A1* | 4/2004 | Ishikawa | B60K 15/03 428/34.1 |
| 2006/0102634 | A1* | 5/2006 | Potter | B60K 15/03177 220/562 |
| 2006/0151505 | A1* | 7/2006 | Kobayashi | B29C 45/14262 220/562 |

FOREIGN PATENT DOCUMENTS

| | | |
|---|---|---|
| CN | 201991591 U | 9/2011 |
| CN | 202325772 U | 7/2012 |
| FR | 2848496 A1 | 6/2004 |

* cited by examiner

AUTOMOBILE UREA TANK FORMING METHOD

CROSS-REFERENCE TO RELATED APPLICATIONS

This application is the United States national phase of International Application No. PCT/CN2012/082253 filed Sep. 28, 2012, and claims priority to Chinese Patent Application Nos. 201210308845.8 and 201220429303.1, both filed Aug. 28, 2012, the disclosures of which are hereby incorporated in their entirety by reference.

BACKGROUND OF THE INVENTION

1. Field of Invention

The present invention relates to an exhaust system of a diesel engine automobile, and in particular to an automobile urea tank and a forming method thereof.

1. Related Art

In order to protect ambient air quality, many countries in the world have introduced laws and regulations to control automobile exhaust. The automobile industry is more concerned about the environmental pollution caused by the exhaust emission. Regulations that strictly limit pollutant emission values are introduced one after another, and the emission requirement on nitrogen oxide is especially strict. With the implementation of EUR06, the emission limit for the nitrogen oxide is reduced to 0.07 g/km. Therefore, main engine plants have launched different new technologies for reducing exhaust emission, including the Selective Catalytic Reduction (abbreviated as SCR) technology. With this technology, the automobile urea solution Adblue is ejected into a specific reduction apparatus in the exhaust pipe and is subject to a chemical reaction with $NO_x$, and finally $NO_x$ is converted into nitrogen and water that do not produce any pollution, and exhausted.

In an SCR technology system, the reducing agent Adblue is mainly stored in a plastic tank body, while Adblue storage tanks currently available on the market are mainly formed through blow molding. The SCR tank body formed through the blow molding process has high cost. The price of a blow molding device is more than ten times of that of an injection molding device, which increases the amortization of each tank body; secondly, the Adblue storage tank for automobiles has a small volume, while it is not easy to control the wall thickness of the tank body and the uniformity of the wall thickness in the blow molding process, which usually results in an excessive wall thickness, causing a waste of raw materials. The blow molded product has a lot of surplus fins at the periphery, which wastes a lot of raw materials. Moreover, in the blow molding process, built-in elements in the tank body are limited; for example, the design of the large part baffle is restricted by the diameter of the outer tank body in the blow molding process. Therefore, it is of urgent necessity to find a new method to solve the above technical problems.

SUMMARY OF THE INVENTION

With regard to the technical problems in the prior art, the present invention provides a new process, namely, an injection molding method. Through the method, design freedom of a tank body is improved, and a subsequent welding step is omitted, thereby simplifying a production process, and shortening a production cycle.

In order to solve the above technical problems, the present invention adopts the following technical solution: an automobile urea tank forming method includes the following steps: 1) producing an upper half casing and a lower half casing through an injection molding method; 2) after the upper half casing and the lower half casing are formed, assembling built-in parts of the upper half casing and the lower half casing; 3) welding the assembled upper half casing and the assembled lower half casing to form a whole; and 4) assembling components on surfaces of the upper half casing and the lower half casing.

As an improvement of the present invention, in step 1, during the injection molding process, a baffle and a tank body surface component assembling structure are injection molded with the upper half casing; a fender assembling screw and a sensor port welding structure are injection molded with the lower half casing; alternatively, a tank body surface component assembling structure is injection molded with the upper half casing; and a baffle, a fender assembling screw, and a sensor port welding structure are injection molded with the lower half casing. During the injection molding process, the baffle is injection molded with the casing to form a whole, which first improves design freedom of built-in elements in the tank body, that is, design of sizes of the built-in elements is no longer restricted by an outer diameter of the tank body, and secondly reduces subsequent welding work.

As an improvement of the present invention, in step 2, a built-in pump assembly of the sensor port welding structure is welded onto the lower half casing.

As an improvement of the present invention, a welding manner adopted in step 3 is any one of or a combination of some of the following manners: laser welding, infrared welding, ultrasonic welding, vibration friction welding, and hot plate welding.

As an improvement of the present invention, in step 4, an inlet control valve, a filling vent valve, and a working vent valve are assembled with the tank body surface component assembling structure on the upper half casing; this method discards the conventional process of punching and welding, and is easy in assembling and excellent in tightness.

As an improvement of the present invention, during a process of welding the built-in pump assembly of the sensor port welding structure onto the lower half casing, barriers are provided on an inner wall of the lower half casing, and the barriers are removed after the welding. When the pump assembly is welded onto the lower half casing, a great pressure needs to be applied during the welding process to ensure fusion between two welding bodies, and an excessive pressure is likely to deform the tank body; therefore, corresponding barriers are disposed on the inner wall of the lower half casing, and the barriers are made of a metal material, thereby guaranteeing the shape stability of the casing under a great pressure. A structure shape of the barrier matches with a structure of the inner wall of the tank body, and may be square or circular. The barriers are symmetrically disposed at two sides of the pump assembly. This method is simple and achieves a good effect, and moreover, saves a lot of raw materials. A conventional blow molded tank body has a high requirement on structure design around the sensor port welding structure, and the design of increasing the wall thickness is often adopted, which wastes more raw materials and hence increases the cost.

A urea tank manufactured using the foregoing method includes an upper half casing and a lower half casing, where the upper half casing is provided with a baffle and a tank body surface component assembling structure that are injection molded with the upper half casing; the lower half casing is provided with a fender assembling screw and a sensor port welding structure that are injection molded with the lower half casing; a pump assembly is welded on the sensor port welding structure; an outer surface of the upper half casing is provided with a valve body structure assembled through the tank body surface component assembling structure such as a buckling structure. This structure is easy to assemble and has good tightness, and can significantly improve the production efficiency and reduce the production cycle.

As an improvement of the present invention, a seal structure is disposed below the valve body; the seal structure is a seal gasket or a seal ring, so as to further enhance the tightness thereof and prevent urea leakage.

As an improvement of the present invention, the valve body includes an inlet control valve, a filling vent valve, and a working vent valve; the inlet control valve is connected to a urea filler tube opening through a urea filler tube; the filling vent valve is connected to a pressure retaining valve through a filling vent pipe; and the working vent valve is connected to a working vent pipe.

As an improvement of the present invention, the urea tank includes an upper half casing and a lower half casing, where the upper half casing is provided with a tank body surface component assembling structure that is injection molded with the upper half casing; the lower half casing is provided with a fender assembling screw, a sensor port welding structure, and a baffle that are injection molded with the lower half casing; a pump assembly is welded on the sensor port welding structure; and an outer surface of the upper half casing is provided with a valve body structure assembled through the tank body surface component assembling structure such as a buckling structure.

As an improvement of the present invention, a seal structure is disposed below the valve body; the seal structure is a seal gasket or a seal ring, so as to further enhance the tightness thereof and prevent urea leakage.

Compared with the prior art, the present invention has the following advantages: 1) the device used in this method has lower cost compared with the conventional blow molding process; therefore, cost is significantly saved and the price is lower, achieving a price advantage on the market; 2) the method can improve the design freedom of built-in elements of the tank body, so that sizes of the built-in elements are no longer restricted by the diameter of the outer tank body in the conventional blow molding process; 3) the wall thickness of the casing is easy to control in this method, so that casings with thinner walls and uniform wall thickness distribution are produced; therefore, a lot of raw materials are saved; 4) products produced through this method do not have a large quantity of surplus fins of raw materials, thereby further saving raw materials; 5) during injection molding in this method, the built-in elements and a part of components are injection molded with the upper and lower half casings to form a whole, thereby reducing subsequent punching and welding; moreover, an assembling manner is employed between the valve body and the casing; the structure is simple and firm; in addition, the production efficiency is improved, and the production cycle is shortened; 6) the urea tank produced through this method has a simple structure; the valve body and components are injection molded with the casing to form a whole, thereby reducing subsequent punching and welding, and further enhancing the firmness and tightness thereof.

DETAILED DESCRIPTION OF THE INVENTION

For further comprehension of the present invention, the present invention is described in detail with reference to the accompanying drawings.

Embodiment 1

Figure 1:
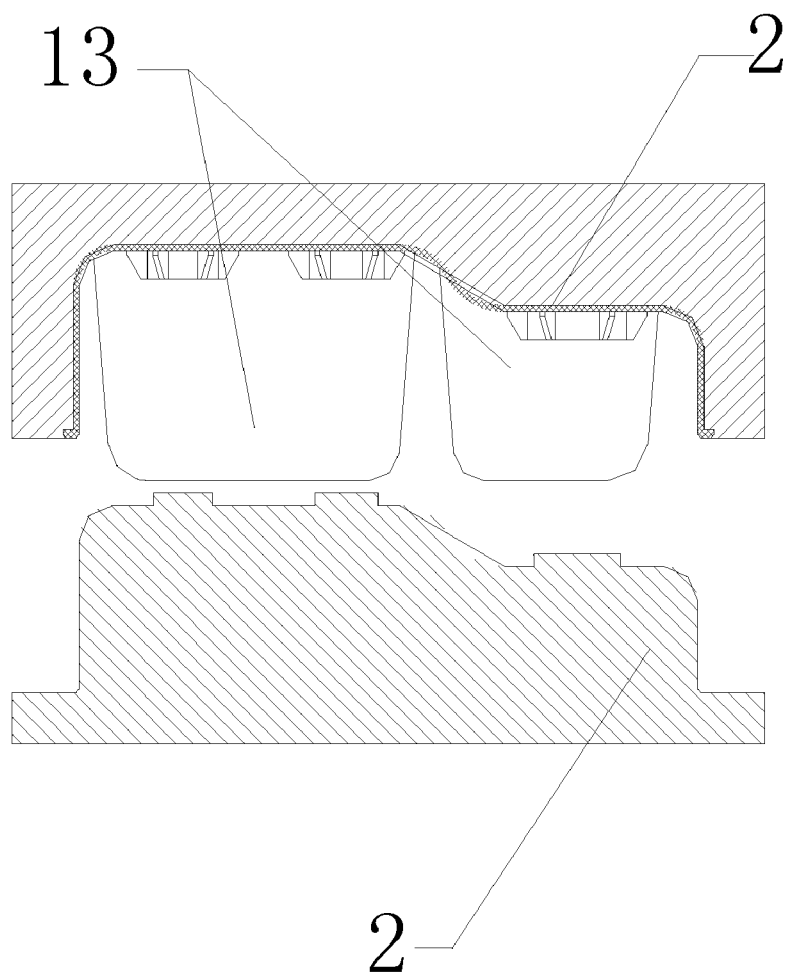
FIG. 1 is a view of an injection molded upper half casing.
Figure 2:
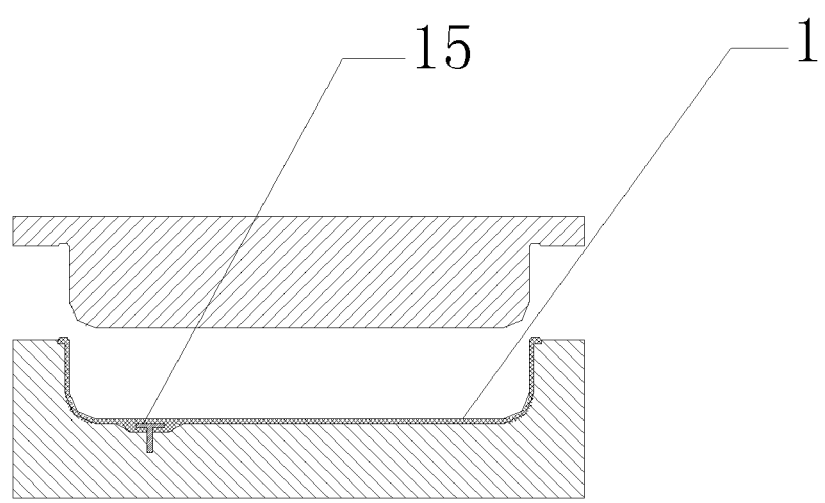
FIG. 2 is a view of an injection molded lower half casing.
Figure 3:
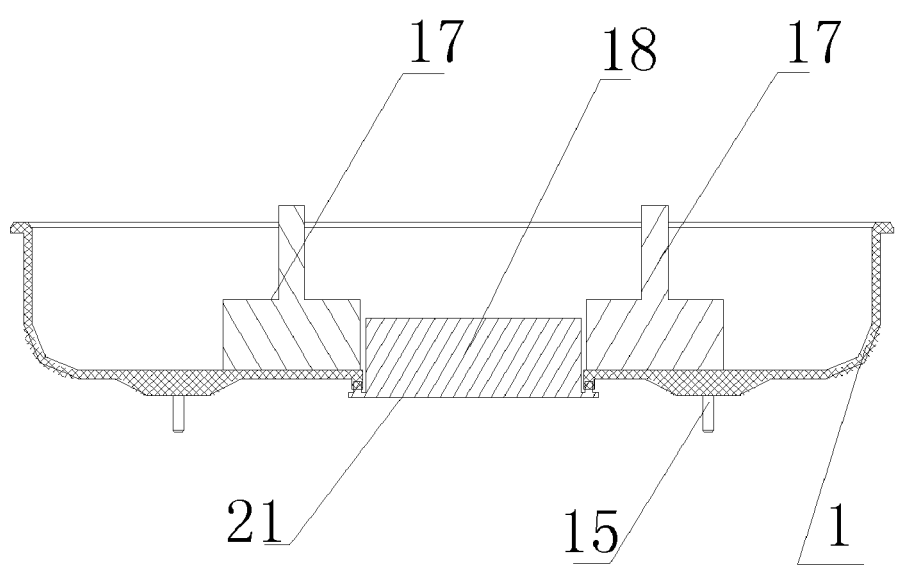
FIG. 3 is a welding schematic view of a pump assembly.
Figure 4:
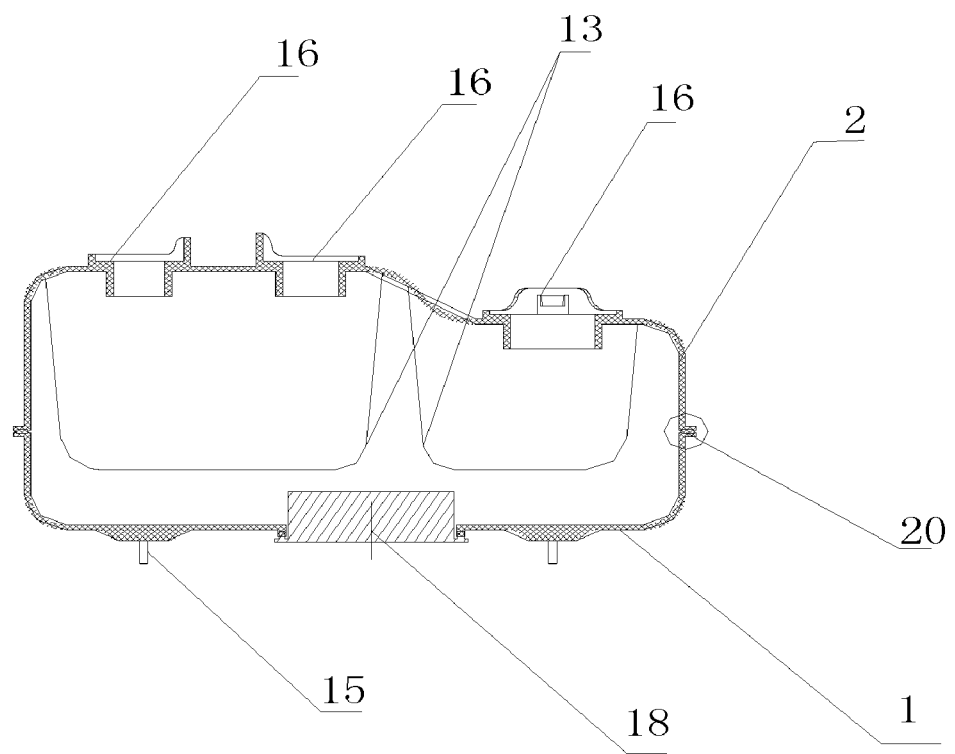
FIG. 4 is a welding schematic view of an upper half casing and a lower half casing.
Figure 5:
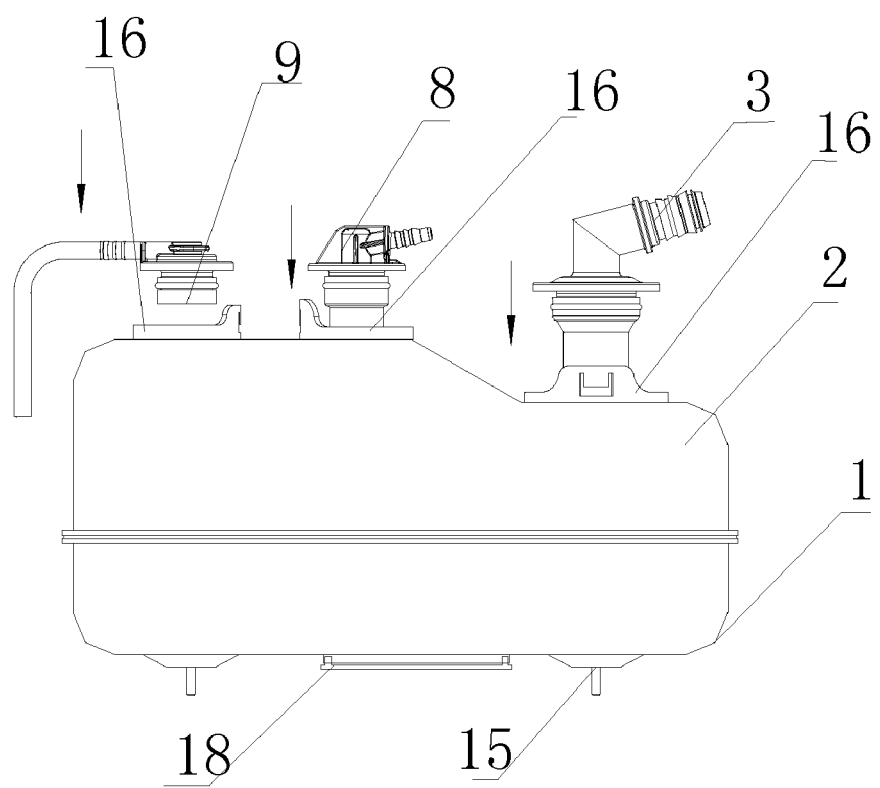
FIG. 5 is an assembling schematic view of a valve body.
Figure 6:
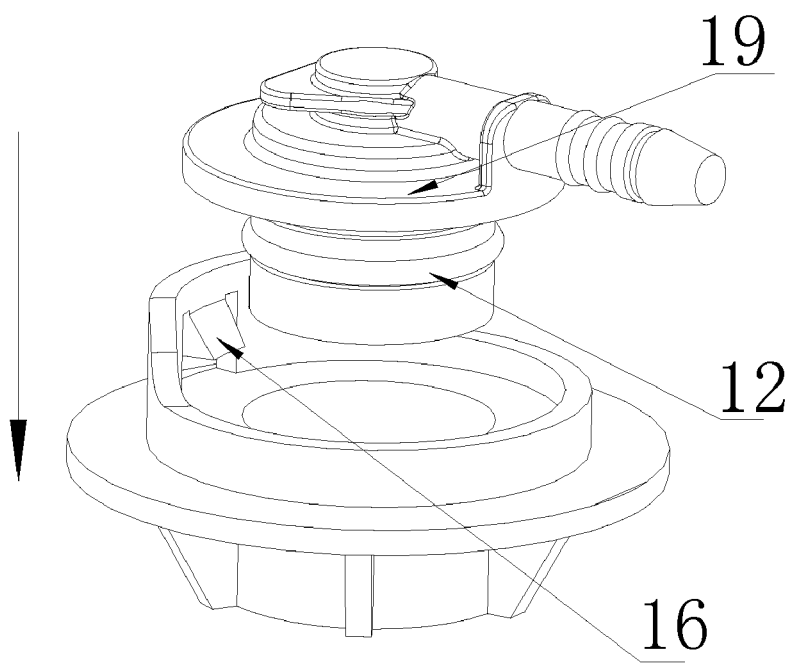
FIG. 6 is an enlarged assembling view of a valve body.
Figure 8:
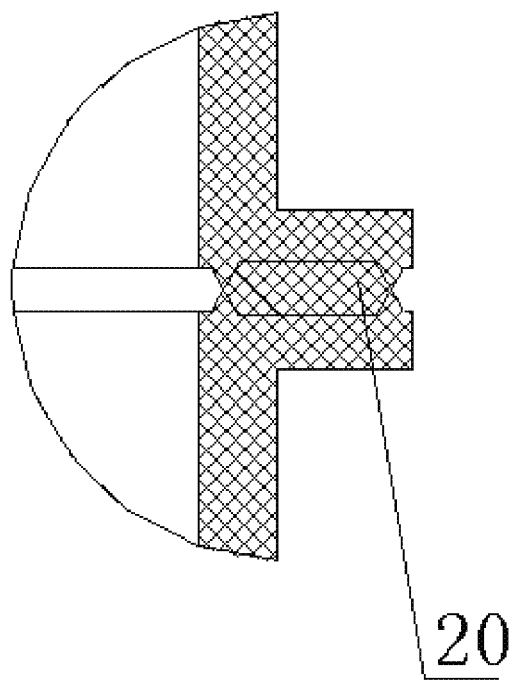
FIG. 8 is an enlarged view of a partial structure of FIG. 4.

Referring to FIG. 1 to FIG. 6, an automobile urea tank forming method includes the following steps: 1) an upper half casing 2 and a lower half casing 1 are produced through an injection molding method. Referring to FIG. 1 and FIG. 2, in the injection molding process, a baffle 13 and a tank body surface component assembling structure 16 are injection molded with the upper half casing 2; a fender assembling screw 15 and a sensor port welding structure 21 are injection molded with the lower half casing 1. By injection molding the baffle 13 and the casing to form a whole, design freedom of built-in elements of a tank body is improved, that is, the setting of the built-in elements is no longer restricted by an outer diameter of the tank body; furthermore, subsequent welding work is reduced. 2) After the upper half casing and the lower half casing are formed, built-in parts of the upper half casing and the lower half casing are assembled, and a built-in pump assembly 18 of the sensor port welding structure 21 is welded onto the lower half casing 1. 3) The assembled upper half casing and the assembled lower half casing are welded to form a whole. Referring to FIG. 4, an adopted welding manner may be any one of or a combination of some of the following manners: laser welding, infrared welding, ultrasonic welding, vibration friction welding, and hot plate welding. FIG. 8 is an enlarged view of a welding structure between the upper half casing and the lower half casing. 4) Components on surfaces of the upper half casing and the lower half casing are welded. Referring to FIG. 6, a valve body 19 and a tank body surface component assembling structure 16 are assembled in accordance with the direction indicated by the arrow, where the tank body surface component assembling structure 16 may be a buckling structure, and the valve body 19 mainly includes an inlet control valve 3, a urea filling vent valve 8, a working vent valve 9, and so on; referring to FIG. 5, the inlet control valve 3, the urea filling vent valve 8, the working vent valve 9, and the tank body surface component assembling structure 16 on the upper half casing 2 are assembled in accordance with the direction indicated by the arrow. This method discards the conventional punching and welding process, and is easy in assembling and excellent in tightness.

Embodiment 2

Referring to FIG. 3, as an improvement of the present invention, when a built-in pump assembly 18 of a sensor port welding structure 21 is welded onto the lower half casing 1, barriers 17 are provided on an inner wall of the lower half casing 1, and the barriers are removed after the welding. When the pump assembly is welded onto the lower half casing, a great pressure needs to be applied during the welding process to ensure fusion between two welding bodies, and an excessive pressure is likely to deform the tank body; therefore, corresponding barriers 17 are disposed on the inner wall of the lower half casing, and the barriers are made of a metal material, thereby guaranteeing the shape stability of the casing under a great pressure. A structure shape of the barrier matches with a structure of the inner wall of the tank body, and may be square or circular. The barriers 17 are symmetrically disposed at two sides of the pump assembly 18. This method is simple and achieves a good effect, and moreover, saves a lot of raw materials. A conventional blow molded tank body has a high requirement on structure design around the sensor port welding structure, and the design of increasing the wall thickness is often adopted, which wastes more raw materials and hence increases the cost.

Embodiment 3

In step 1, an upper half casing 2 and a lower half casing 1 are produced through an injection molding method; in the injection molding process, a tank body surface component assembling structure 16 is injection molded with an upper half casing 2; a baffle 13, a fender assembling screw 15, and a sensor port welding structure are injection molded with the lower half casing 1. Other steps and advantages are exactly the same as embodiment 1.

Embodiment 4

Figure 7:
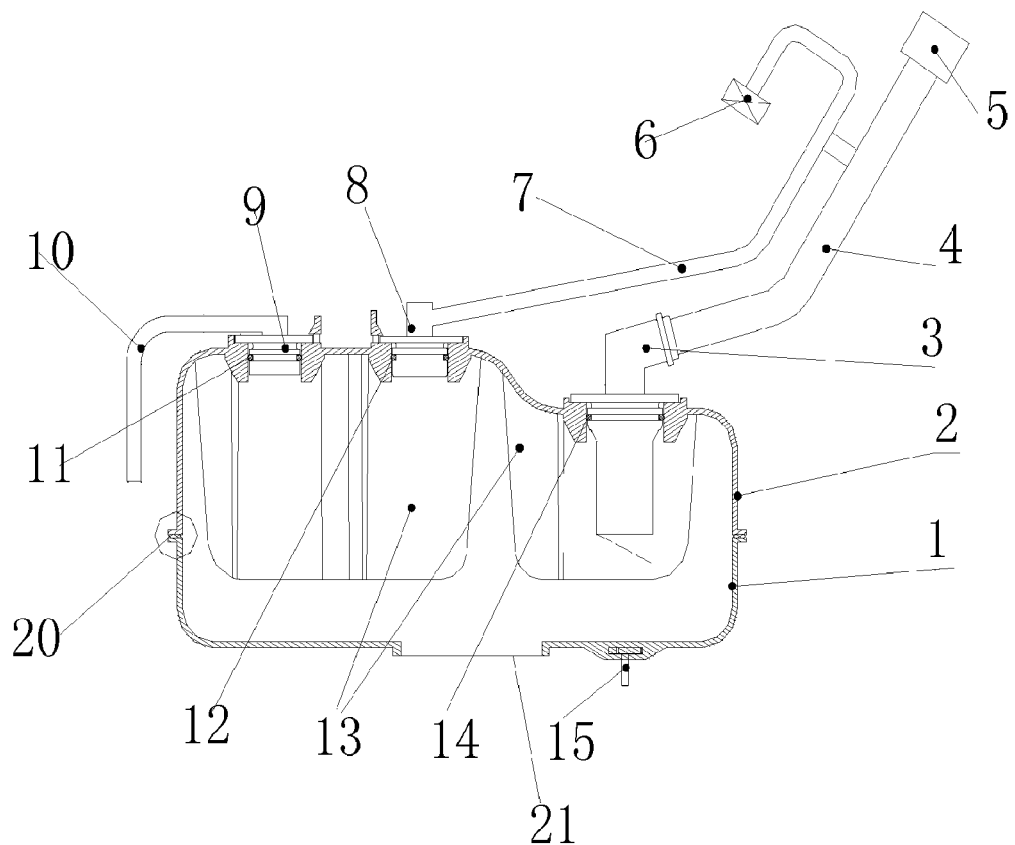
FIG. 7 is an overall schematic structural view of a urea tank.

Referring to FIG. 7, a urea tank produced using the above method includes an upper half casing 2 and a lower half casing 1. The upper half casing 2 is provided with a baffle 13 and a tank body surface component assembling structure 16 that are injection molded with the upper half casing 2; the lower half casing 1 is provided with a fender assembling screw 15 and a sensor port welding structure 21 that are injection molded with the lower half casing 1; a pump assembly 18 is welded on the sensor port welding structure; an outer surface of the upper half casing is provided with a valve body 19 structure assembled through the tank body surface component assembling structure 16 such as a buckling structure. This structure is easy to assemble and has good tightness, and can significantly improve the production efficiency and shorten the production cycle.

Embodiment 5

Referring to FIG. 5 and FIG. 6, a seal structure is disposed below the valve body 19; the seal structure is a seal gasket or a seal ring, so as to further enhance the tightness thereof and prevent urea leakage. The valve body 19 includes an inlet control valve 3, a filling vent valve 8, and a working vent valve 9; the inlet control valve 3 is connected to a urea filler tube opening 5 through a urea filler tube 4; the filling vent valve 8 is connected to a pressure retaining valve 6 through a filling vent pipe 7; and the working vent valve 9 is connected to a working vent pipe 10. Other structures and advantages are exactly the same as embodiment 4.

Embodiment 6

A urea tank produced using the above method includes an upper half casing 2 and a lower half casing 1, where the upper half casing 2 is provided with a tank body surface component assembling structure 16 that is injection molded with the upper half casing 2; the lower half casing is provided with a fender assembling screw 15, a sensor port welding structure 21, and a baffle 13 that are injection molded with the lower half casing; a pump assembly 18 is welded on the sensor port welding structure; an outer surface of the upper half casing 2 is provided with a valve body 19 assembled through the tank body surface component assembling structure 16 such as a buckling structure; a seal structure is disposed below the valve body 19; the seal structure is a seal gasket or a seal ring, so as to further enhance the tightness thereof and prevent urea leakage.

The present invention may also combine embodiments 1 and 2 or embodiments 2 and 3 to form a new technical solution.

The present invention may also combine embodiments 4 and 5 or embodiments 5 and 6 to form a new technical solution.

It should be noted that the foregoing embodiments are merely preferred embodiments of the present invention, and are not intended to define the protection scope of the present invention. Any equivalent alteration made on the basis of the foregoing method belongs to the protection scope of the present invention.

What is claimed is:

1. An automobile urea tank forming method, comprising the following steps:
   (a) producing an upper half casing and a lower half casing through an injection molding method;
   (b) after the upper half casing and the lower half casing are formed, assembling built-in parts of the upper half casing and the lower half casing;
   (c) welding the assembled upper half casing and the assembled lower half casing to form a whole; and
   (d) assembling components on surfaces of the upper half casing and the lower half casing,
   wherein, in step (a) in the injection molding process, a baffle and a tank body surface component assembling structure are injection molded with the upper half casing; a fender assembling screw and a sensor port welding structure are injection molded with the lower half casing; alternatively, a tank body surface component assembling structure is injection molded with the upper half casing; and a baffle, a fender assembling screw, and a sensor port welding structure are injection molded with the lower half casing.

2. The automobile urea tank forming method according to claim 1, wherein in step (b), a built-in pump assembly of the sensor port welding structure is welded onto the lower half casing.

3. The automobile urea tank forming method according to claim 2, wherein during a process of welding the built-in pump assembly of the sensor port welding structure onto the lower half casing, barriers for enhancing stability of the lower half casing are provided on an inner wall of the lower half casing, and the barriers are removed after the welding.

4. The automobile urea tank forming method according to claim 3, wherein a structure shape of the barrier matches with an inner wall structure of the tank body, and the barriers are symmetrically disposed at two sides of the pump assembly.

5. The automobile urea tank forming method according to claim 2, wherein in step (d), an inlet control valve, a filling vent valve, and a working vent valve are assembled with the tank body surface component assembling structure on the upper half casing.

6. The automobile urea tank forming method according to claim 1, wherein a welding manner adopted in step (c) is any one of or a combination of some of the following manners: laser welding, infrared welding, ultrasonic welding, vibration friction welding, and hot plate welding.

7. The automobile urea tank forming method according to claim 1, wherein in step (d), an inlet control valve, a filling vent valve, and a working vent valve are assembled with the tank body surface component assembling structure on the upper half casing.

\* \* \* \* \*